Patented May 19, 1925.

1,538,247

UNITED STATES PATENT OFFICE.

HEINRICH KRIEGSHEIM, OF NEW YORK, AND WILLIAM VAUGHAN, OF BROOKLYN, NEW YORK, ASSIGNORS TO THE PERMUTIT COMPANY, OF NEW YORK, N. Y., A CORPORATION OF DELAWARE.

TREATING GLAUCONITE.

No Drawing.    Application filed March 27, 1922. Serial No. 547,342.

*To all whom it may concern:*

Be it known that we, HEINRICH KRIEGSHEIM, a citizen of the United States, and a resident of New York, in the State of New York, and WILLIAM VAUGHAN, a citizen of the United States, and a resident of Brooklyn, in the State of New York, have invented certain new and useful Improvements in Treating Glauconite, of which the following is a specification.

This invention relates to treating glauconite; and it comprises a method wherein glauconite is submitted to alternating treatments with liquids containing electrolytes and liquids relatively free therefrom until colloidable fine matter is detached and removed; all as more fully hereinafter set forth and as claimed.

Glauconite is the characteristic mineral of the "greensand marls" found in extensive deposits in New Jersey, Maryland, Virginia, etc. As found, it is in small green granules, probably of a cryptocrystalline character and consisting essentially of a hydrated double silicate of iron and potassium. It is of marine origin and is supposed to be formed, at least to a large extent, as casts in foraminiferous shells; this giving the granule its shape. As it occurs in the greensand marl bed, the glauconite granules are mixed with clay, sand, etc. Sometimes, the amount of the admixture is quite great; sometimes, there is not much impurity. There is, however, always some admixture of other minerals. The glauconite granules themselves, when isolated from other accompanying minerals, are not of a pure character; they are not unitary and homogeneous and do not consist wholly of the stated characteristic green double silicate; there is other matter present. The exact nature of this foreign matter (if it can be so called) is uncertain. It may, in large part, represent incompletely glauconitized material, or decayed glauconite. Or it may be largely actual foreign matter—non-glauconitic material. Under the microscope, the green granules are seen to carry inclusions and accretions, generally of a grayish or brownish color. To some extent this foreign matter is apparently a cementing means or matrix holding particles of glauconite together. Some of the glauconite granules are composite.

Glauconite is now used as a water purifying material in the so-called "zeolite" processes of softening water. In these processes, hard water to be softened is run through a granular bed of materials to which it gives up lime and magnesia. After a time, when the bed loses its softening power to a greater or less extent, it is regenerated by passage of a salt solution. After washing, it is again ready for use. In certain cases, glauconite used in this way has advantages over the ordinary zeolites. Being heavier, it is less buoyed by air released from the water in warming up; it is somewhat less sensitive to slightly acid waters, such as those sometimes produced in alum processes of clarification, etc. To enable its use for water purification, the natural glauconite is often simply mechanically separated from accompanying minerals, as nearly as may be by various processes and directly used after screening and sizing.

In use in water purification, it is desirable that the glauconite granules be clean and free of fines, which would close or impede the channels through the bed. It is desirable to have as little resistance as possible to the passage of water. It is also, of course, quite undesirable to have the glauconite give any muddiness, turbidity, color or haziness to passing water.

It is found, however, that clean, granular glauconite used in its natural condition, in these devices does not always give satisfactory results in these respects. It is apt to give a turbidity to the water for some time after an installation has been put in service; giving up enough finely divided matter to impart a greenish color and haziness or turbidity to the water. Sometimes this effect lasts for a relatively long period of time. As the use continues, there is also usually a development of fines or undersize granules which tend to clog the bed more or less. Often it is necessary after a lapse to interrupt the use of the device and get rid of the fine matter clogging the bed. Sometimes it requires a relatively long time for the bed to come to what may be called a satisfactory condition. These results we have traced to the presence of the stated "foreign matter" occurring in or on the glauconite granules as they are found in nature.

It is the object of the present invention to provide a method of freeing glauconite of this "foreign matter" and producing a material free of the noted objections; being stable in the water softening device and not breaking down even after long use and not imparting color or turbidity to the water purified thereby. The product of this method is composed of homogeneous and unitary clean-surfaced granules, free of grayish or brownish spots and having a somewhat increased effective area; the active glauconite being exposed to the passing water at all points. The material is free of decomposed or disintegrable matter. In this method, we take advantage of the differential in the attackability of the glauconite proper, that is, the stated double silicate, and of the associated minerals which, for the sake of brevity we may here designate as "clay", without meaning thereby to imply any particular chemical composition. As a matter of fact, this associated mineral is to some extent true clay, but it also contains some material which is near glauconite in composition; being perhaps, as stated, decomposed or decayed glauconite or perhaps material in an arrested state of glauconitization. Pyrites is often present.

Physically, glauconite is not much affected by contact with saline solutions or solutions containing electrolytes, or by soft water. This, however, is not true of clayey matters generally, or of the "foreign matters" associated with the glauconite which, in this respect, behave something like clay. Saline solutions convert clay into what is known as a "flocculated" state and soft water into what is known as the "deflocculated" condition; a condition in which it is able to form dispersoid suspensions in water. An alternating treatment with salt solutions and soft water will disintegrate even hard clays (such as shales) and we have found the same to be true with the associated minerals forming part of the natural glauconite granules; a fact which probably explains much of the trouble in using such natural granules in softening water. In the present invention, therefore, we simply expose the glauconite granules to such an alternating treatment, washing away in each step the fines produced by disintegration of the associated minerals by the liquids employed.

As the electrolyte solution we may use a solution of common salt or another saline; or acids or alkalies may be used. An alkaline solution of common salt is advantageous. Ordinary water may be employed in the other phase of the alternation. Operation is usually with the liquids rather warm; say, at 120° to 150° F. Ordinarily, a succession of three to five alternations suffices to produce a material from which fine particles are no longer detached in service. The purifying operation may be quickened by a preliminary treatment with a somewhat acid or somewhat alkaline solution; such as a solution containing aluminum sulfate of a weak solution of sodium hydroxid (caustic soda). An alkaline solution of common salt works well. Some acid or alkaline reacting substance may be mixed with subsequent washing liquids. The washing treatment may be controlled by microscopical examination of the granules and is carried on to a point where the stated adhesions visibly diminish or disappear. As soon as all the fine particles mixed with the coarser grains of glauconite are removed and the "foreign" substances in or on the individual grains have disappeared, the clean material will be suitable for the purpose of the water purification. This stage or condition may be easily determined by a hand lens or by a microscope.

In a practical embodiment of the present invention, the whole process may be performed in a single tank, which is best provided with a strainer or diaphragm of wire mesh in the bottom. It is often advisable to place a layer of gravel over the strainer and support the glauconite to be treated on this. The glauconite granules in general are quite small and this gravel prevents loss in draining; and it also serves, in connection with the strainer, to give an even distribution of the wash liquids in treatment; these wash liquids being usually sent upwardly through the glauconite. The glauconite may or may not be submitted to any of the usual mechanical or magnetic purifying treatments or sized and screened prior to applying the present process. Often this preliminary treatment is not worth while, since the present process will take care of any fines and dirt, and also effects sizing automatically. The first washing treatment is ordinarily with water. The flow may be at the rate of a cubic foot per minute per square foot of the bed. This flow detaches and carries away a large amount of fines; these fines often containing more or less pyrites. The flow may continue for an hour or so; and if economy of water is an object, as it often is, the emerging water may be settled in a suitable tank and returned for use anew. In settling, it is often a useful expedient to use a little aluminum sulfate or "sulfate of alumina" or other coagulant to clarify the water prior to returning it. The temperature of the operation may be advantageously 120° to 150° F. Operation may be at room temperature but then requires a somewhat longer time and more water. With the stated rate of flow, the granules of the glauconite bed are lifted more or less, but only the undersized material and fines are carried away. In lifting, there is more or less mutual friction of the granules and this is probably useful in detaching fines and "clays." To promote this and to carry away fines, it is desirable to have a rather swift passage of water; at about the rate stated. The time consumed in this washing naturally varies somewhat with the nature of the material; and it is generally continued until, say, not more than 10 cc. of mud will separate out of 500 cc. of wash water on standing. With average material, about 15 cubic feet of water are required to wash a cubic foot of raw glauconite to this stage of cleanliness. This is, of course, the total amount of water; the amount of water which is run through the bed; but, as stated, the water may be reused. The greater the amount of preliminary purification of the glauconite which has been effected (if any), the less is the extent of washing necessary in this stage.

After the washing has gone to the extent desired, the water is cut off and the glauconite allowed to settle and partially drain. In the stratification effected in settling, there will be formation of an upper layer of material finer than 60 mesh; this material being partly fine glauconite and partly "clay" and other minerals. This layer is removed and discarded, partly because of its impurity and partly because in any event material finer than 60 mesh is not desirable in water softening apparatus. It may, however, be used in various ways (not here important) of producing a synthetic granulated softening material. Because of its glauconite content, the material may be made into a useful fertilizer. Ordinarily, the upper layer differs markedly in color from the next below. Usually, it is gray. It may be shoveled off or otherwise removed. With ordinary glauconite having no pre-purification, this layer may amount to as much as 10 per cent; that is, out of a charge of, say 200 cubic feet, perhaps, 20 cubic feet will be found in this top layer.

The next operation is to repeat the washing with a solution containing an electrolyte. Ordinarily, we use a common salt solution of 10° Baumé or somewhat stronger. With this salt solution may be advantageously admixed a certain amount of caustic alkali. Use of alkali hastens the operation. In factories making artificial zeolites by fusion methods, there are generally alkaline liquids available which can be used in giving alkalinity to the salt solution. They are usually hot as produced and the heat is utilized.

The flow of salt solution through the bed of glauconite may be at the same rate as that of the water previously used. It is best sent through in an upward direction. It conduces to economy of operation to take the salt solution coming from the tank above the bed and settle it or filter it and then return it for passage anew. The salt solution in this stage does not generally detach much fine matter. Its function is to place the "clay" in such a condition that a following water wash will detach and remove it. It ordinarily takes on a greenish color as soon as it contacts with the bed and if the green is not too strong, the same solution may be used repeatedly in this manner. The green color of the used brine and the matter suspended therein can easily be removed by the addition of small amounts of aluminum sulfate. The slight acidity of the brine (where this is not originally acid or alkaline) produced by the decomposition of the aluminum sulfate often appears to be advantageous.

After the passage of the salt solution has been continued as long as is deemed necessary, the residual salt solution is drained away and washing with water again effected in the same manner as at first. There is again a detaching or production of fine material. The wash water running from the bed is usually green at first. This second water washing is continued until 500 cc. separates no more than 5 cc. of mud on settling. There is once more produced a top stratified layer of fine mud; usually of a more or less gray color. This layer, which is usually quite thin, is mechanically removed, being, for example, shoveled off.

The material is next again treated with a salt solution. If the amount of sludge produced in the second water washing was large, it is desirable to continue this second saline treatment for a rather long time; say, for an hour. Otherwise, a short treatment of half-an-hour or so mostly suffices. Another treatment with fresh water for, say, half-an-hour and then another treatment with saline solution for some time may follow.

The number of these treatments which are required depends altogether on the original material. Three or four treatments with water and with salt solution may be required.

After the various washings have been effected, we generally remove the glauconite from the washing vessel by displacement with a strong current of water; thereby effecting a separation of heavier or oversize minerals, if any be present. The washed glauconite may then be dried in any suitable manner and shipped, stored or used.

In the washing with water and with salt solution in the case of dirty materials, it is sometimes advisable to use other methods of stirring or lifting the granules in addition to the liquid current. For this purpose, air may be blown into the bed or mechanical stirrers may be employed.

No particular chemical action upon the glauconite by the salt solution is desired in this connection. In so far as it takes place, however, it is not injurious. Where common salt is the electrolyte employed, the glauconite takes up sodium in the first passage of brine, but is not thereafter chemically affected by succeeding passages of brine. In the water washing stage, it is better to use soft water; but if the water is used over and over again, as is usually the case, the glauconite itself will remove hardness.

On examination under the microscope, raw or natural glauconite grains show a rounded shape and a tolerably smooth surface; this surface being of a glassy green color but with numerous areas of grayish or brownish color, these areas being somewhat elevated above the general plane of the surface. These are the material we have called "clay." In using such glauconite in softening water, the material in these areas wastes away somewhat, but generally does not disappear altogether. It does not seem to have any, or any notable, softening activity; and to the extent of its presence it detracts from that of the green mineral which it overlies. Glauconite grains treated by the present process no longer show the presence of the gray or brown mineral. On shaking with water in a bottle with some degree of energy, there is no detachment either of grayish or greenish matter; nor can such detachment be produced by alternate treatments with strong salt solution and with water. In mass, the material is of a somewhat deeper and purer green than the untreated mineral. In the water purifying apparatus, there is no production of muddiness, haziness or green color; neither is there any production of fines clogging the bed. The material has a considerable degree of mechanical strength and even violent agitation and friction in the water softening and regeneration operations do not produce fines. Unlike the untreated glauconite, it is not necessary from time to time to remove fine material under 60 mesh and replace it by new, coarser material.

What we claim is:—

1. The process of treating glauconite which comprises submitting a bed of natural glauconite to a plurality of alternating washings with water and with a solution containing an electrolyte, with collection and removal of fine material separated by and produced in such washings.

2. The process of treating glauconite which comprises submitting a bed of natural glauconite to a plurality of alternating washings with water and a solution of common salt with collection and removal of fine material separated by and produced in such washings.

3. The process of treating glauconite which comprises submitting a bed of glauconite to a plurality of alternating washings with water and an alkaline solution of common salt with removal of fine material separated by and produced in such washings.

4. The process of treating glauconite which comprises submitting a bed of glauconite to a plurality of alternating washings with water and with a solution containing an electrolyte, with removal of fine material separated by and produced in such washings, each washing being discontinued when the fine material removed is not more than about 5 cc. in 500 cc. of washings.

5. The process of treating glauconite which comprises submitting a bed of glauconite to a plurality of alternating washings with warm water and with a warm solution containing an electrolyte, with removal of fine material separated by and produced in such washings.

6. The process of treating glauconite which comprises submitting a bed of glauconite to a plurality of alternating washings with water and with a solution containing an electrolyte, the liquids passing the bed being clarified and retransmitted therethrough.

7. The process of treating glauconite which comprises submitting a bed of glauconite to a plurality of alternating washings with water and with a solution containing an electrolyte, the liquid passing the bed being settled and clarified by the use of coagulant chemicals and retransmitted therethrough.

8. The process of treating glauconite which comprises submitting a bed of glauconite to a plurality of alternating washings with soft water and with a solution containing an electrolyte.

Signed at New York, in the county of New York and State of New York, this 21st day of March, 1922.

HEINRICH KRIEGSHEIM.
WILLIAM VAUGHAN.

CERTIFICATE OF CORRECTION.

Patent No. 1,538,247.                                              Granted May 19, 1925, to

HEINRICH KRIEGSHEIM ET AL.

It is hereby certified that error appears in the printed specification of the above numbered patent requiring correction as follows: Page 2, line 67, for the word "of" read "or"; and that the said Letters Patent should be read with this correction therein that the same may conform to the record of the case in the Patent Office.

Signed and sealed this 29th day of May, A. D. 1928.

(Seal)                                                          M. J. Moore,
                                                                        Acting Commissioner of Patents.